Jan. 17, 1928.
W. S. YALE
1,656,258
METHOD OF JOINING SHEATHS FOR CORES
Filed April 9, 1925
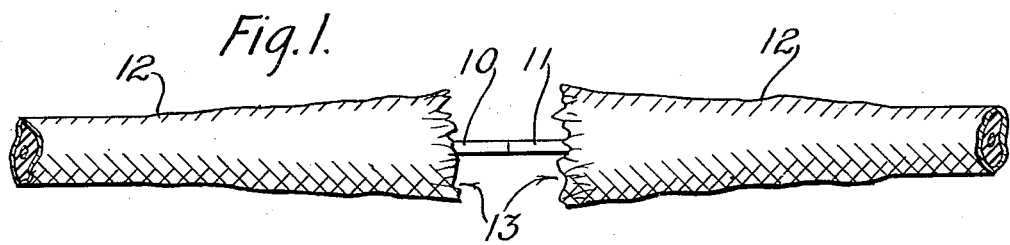
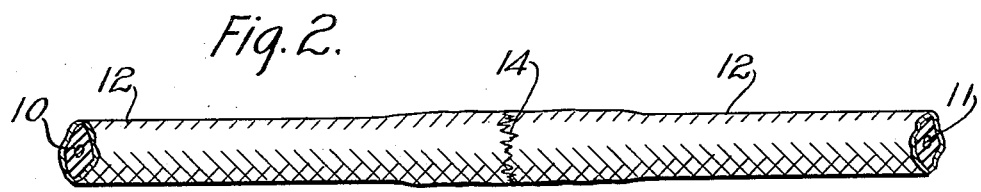
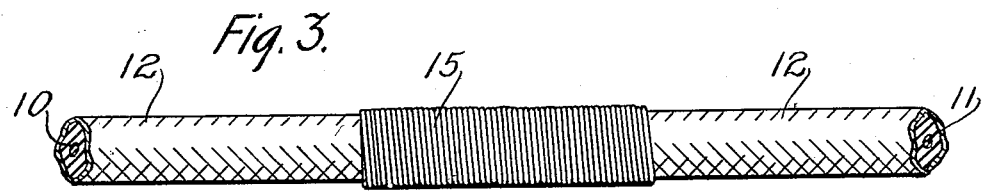
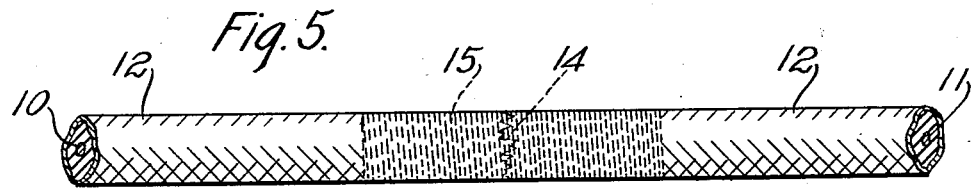
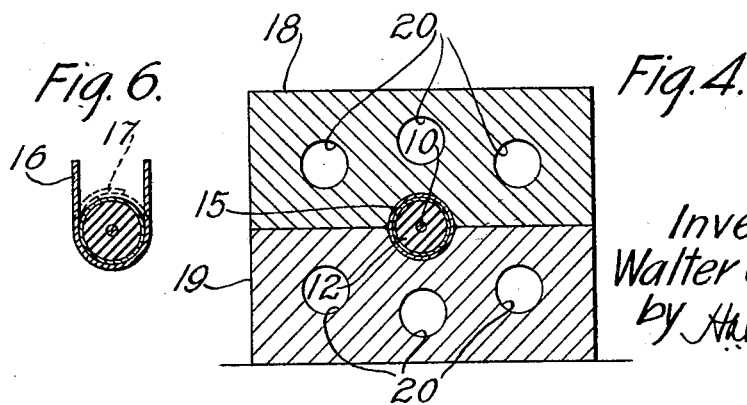
Inventor
Walter S. Yale
by
Att'y.

Patented Jan. 17, 1928.

1,656,258

UNITED STATES PATENT OFFICE.

WALTER SAWER YALE, OF MAYWOOD, ILLINOIS, ASSIGNOR TO WESTERN ELECTRIC COMPANY, INCORPORATED, OF NEW YORK, N. Y., A CORPORATION OF NEW YORK.

METHOD OF JOINING SHEATHS FOR CORES.

Application filed April 9, 1925. Serial No. 21,881.

This invention relates to methods of joining sheaths for cores, and more particularly to methods of insulating the spliced ends of textile covered insulated electrical conductors and has for its primary object the provision of an improved method whereby sheaths of cores may be joined in a minimum amount of time and one that provides a maximum of mechanical strength and insulating qualities.

In accordance with the general features of this invention as applied to the splicing of electrical conductors having a braided textile covered insulation, the method consists in drawing the braided covering and the insulation back from the ends of the conductors, thereafter brazing or welding the conductors together, returning the end portions of the covering and insulation to substantially their original positions and in abutting relation. Fibrous material in strand or sheet form impregnated with substances which may be cured, vulcanized or otherwise transformed into a substantially stable state by a chemical reaction when subjected to heat and pressure, such as synthetic resin or a rubber compound is wrapped around the abutting portions of the braided covering and the wrapped portion is subjected to heat and pressure to cure the resin or to vulcanize the rubber.

It is believed that the invention will be clearly understood from the following description and the accompanying drawing, the figures of which illustrate the several steps by means of which the invention may be practiced.

Fig. 1 is an elevational view showing the ends of a pair of electrical conductors prepared and in position for the brazing or welding of the ends thereof together;

Fig. 2 is an elevational view thereof after the brazing operation and with the end portions of braided covering and insulation in abutting relation;

Fig. 3 is an elevational view thereof with a wrapping of impregnated fibrous strand material around the splice;

Fig. 4 is a sectional view illustrating diagrammatically one means of applying heat and pressure to cure the synthetic resin or to vulcanize the rubber and mold the covering;

Fig. 5 is an elevational view of an electrical conductor upon completion of the splice, and Fig. 6 is a vertical section through the spliced conductors showing an alternative means for applying the synthetic resin or rubber compound.

In practicing the invention as illustrated in the drawing (Fig. 1) the rubber or other suitable insulation and the braided or other textile sheath or covering 12 thereover is slipped back for a distance indicated at 13 along a pair of conductors or other cores, 10 and 11 to be spliced. The ends of the conductors 10 and 11 are then brought into abutting relation and brazed or welded in any manner well known in the art and thereafter the insulation and braided covering 12 at each side of the joint are restored to substantially their original positions with their ends in an abutting relation as indicated at 14 (Fig. 2). The braided covering 12 upon each conductor may be spliced at the junction 14 by wrapping therearound for a suitable distance at either side of the junction 14, a fibrous material, for instance cotton thread 15 impregnated either with a synthetic resin or a vulcanizable rubber compound, or a sheet of fibrous material such as cloth indicated at 16 (Fig. 6) and similarly treated. In using the sheet 16, the ends thereof are preferably overlapped as indicated in dotted outline at 17 and the sheet extends a distance at each side of the junction 14, as indicated for the thread 15 in Fig. 3. The braided covering 12 itself may be similarly impregnated or otherwise treated with resin in a liquid form or treated with vulcanizable rubber compound. The spliced conductor as illustrated in Figs. 3 or 6 is then placed in a press of any suitable type (not shown) having molds or platens as indicated at 18 and 19. The platens may be heated by passing steam through the passages 20 to any desired temperature and subjected to a sufficient and predetermined pressure to completely transform the impregnating substance by a chemical reaction into a substantially stable state. Thus the synthetic resin is transformed into an insoluble and infusible product or the rubber compound is vulcanized, the cured resin or vulcanized rubber forming an insulator for the brazed conductors as well as a bond for the abutting ends of the textile braided covering 12. The forming portions of the platens 18 and 19 are such that upon completion of the splicing and insulating method hereinabove described the diameter of the spliced and insulated portion will be substantially. the same as that of the balance of the insulated electrical conductor. When the fibrous material is impregnated with a vulcanizable substance, a rubber compound including sulphur in a finely divided or colloidal form or some other suitable compound capable of being quickly vulcanized is preferable.

In splicing insulated electrical conductors it is desirable that a splice be made and insulated in as short a time as possible and still possess high insulating qualities and mechanical strength without materially detracting from the flexibility of the conductor along the spliced portion. A splice formed by the hereinbefore described method possesses these characteristics.

What is claimed is:

1. The method of joining textile protective sheaths for cores, which consists in placing the end portions of sheaths adjacent, applying a synthetic resinous substance to the end portions, and subjecting the applied substance to heat and pressure to transform it into an infusible and insoluble product thereby bonding the end portions.

2. The method of joining textile protective sheaths for cores, which consists in placing the end portions of sheaths adjacent, applying a covering of material impregnated with a synthetic resinous substance to the end portions, and subjecting the material to heat and pressure to transform the substance into an infusible and insoluble product thereby bonding the end portions.

3. The method of joining textile protective sheaths for cores, which consists in placing the end portions of sheaths adjacent, serving a fibrous strand impregnated with a synthetic resinous substance around the end portions, and subjecting the substance to heat and pressure to transform it into an infusible and insoluble product thereby bonding the end portions.

4. The method of joining the covering of insulated electrical conductors, which consists in placing the end portions of the covering in abutting relationship, treating the covering adjacent the abutting ends with a material which can be transformed into an infusible and insoluble product by heat and pressure, and then subjecting said material to heat and pressure to transform it into an infusible and insoluble product bonding the ends of the covering.

5. The method of joining the covering of insulated electrical conductors, which consists in placing end portions of the covering in abutting relationship, forming a film of material around the covering adjacent the abutting ends which can be transformed into an infusible and insoluble product by heat and pressure, and subjecting said material to heat and pressure to transform it into an infusible and insoluble product bonding the ends of the covering.

6. The method of joining the covering of insulated electrical conductors, which consists in placing the end portions of the covering in abutting relationship, applying a synthetic resin to the covering adjacent the abutting ends, and curing said synthetic resin to form an infusible and insoluble bond between the ends of the covering.

7. The method of joining the covering of insulated electrical conductors, which consists in placing the end portions of the covering in abutting relationship, serving a fibrous material impregnated with a synthetic resin around the covering adjacent the abutting ends, and subjecting the served ends to heat and pressure to transform the resin into a final condensation product to form an infusible and insoluble bond between the ends of the covering.

8. The method of joining the covering of insulated electrical conductors, which consists in placing the end portions of the covering in abutting relationship, serving a strand of fibrous material impregnated with a synthetic resin spirally around the covering adjacent the abutting ends, and subjecting the served ends to heat and pressure to transform the resin into a final condensation product to form an infusible and insoluble bond between the ends of the covering.

9. The method of joining the covering of insulated electrical conductors, which consists in placing the end portions of the covering in abutting relationship, wrapping a sheet of fibrous material impregnated with a synthetic resin around the covering adjacent the abutting ends, and subjecting the wrapped ends to heat and pressure to transform the resin into a final condensation product to form an infusible and insoluble bond between the ends of the covering.

10. The method of joining textile protective sheaths for cores, which consists in placing the end portions of sheaths adjacent, treating the sheaths adjacent the abutting ends with a material which can be transformed into an infusible and insoluble product by heat and pressure, and subjecting said material to heat and pressure to so transform it thereby bonding the ends of the sheaths and simultaneously therewith forming the ends to a diameter substantially the same as the adjoining portions of the sheaths.

11. The method of joining covered insulated electrical conductors, which consists in drawing back the covering from the ends of the conductors to be joined, connecting the ends of the conductors, returning the coverings to substantially their original positions and with the ends in abutting relation, serving a cotton thread impregnated with a synthetic resin spirally around the covering adjacent the abutting ends, and subjecting the served portions of the conductor to heat and pressure to transform the resin into a final condensation product to form a bond between the ends of the covering and simultaneously therewith forming the served portion to a diameter therefor substantially the same as the adjoining portions of the covered conductor.

In witness whereof, I hereunto subscribe my name this 30 day of March, A. D., 1925.

WALTER SAWER YALE.